J. W. MOORE.
SWING.
APPLICATION FILED DEC. 22, 1914.
1,148,395.
Patented July 27, 1915.
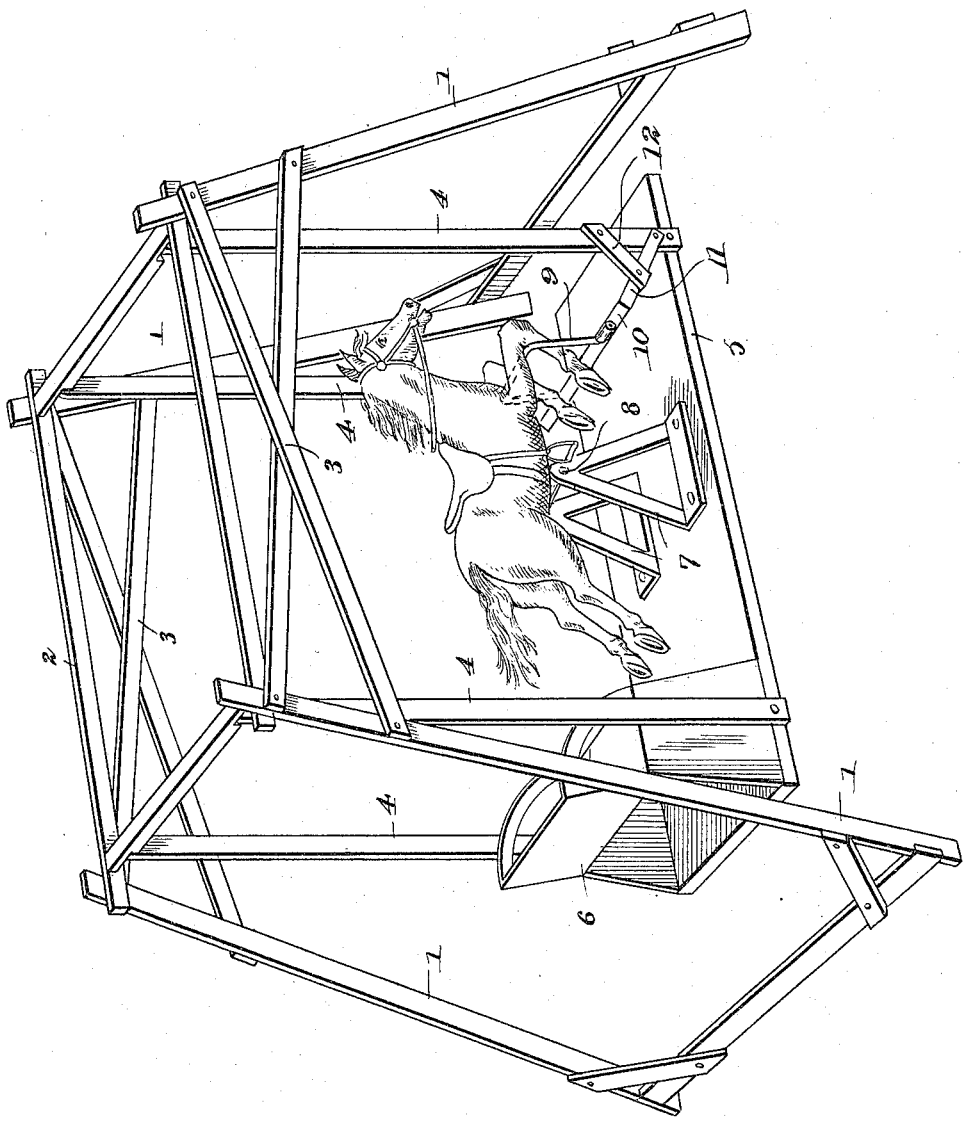
Witnesses
Frederick W Ely
[signature]
Inventor
J. W. Moore,
By Victor J. Evans
Attorney

UNITED STATES PATENT OFFICE.

JAMES W. MOORE, OF ST. JOSEPH, MISSOURI.

SWING.

1,148,395. Specification of Letters Patent. Patented July 27, 1915.

Application filed December 22, 1914. Serial No. 878,565.

*To all whom it may concern:*

Be it known that I, JAMES W. MOORE, a citizen of the United States, residing at St. Joseph, in the county of Buchanan and State of Missouri, have invented new and useful Improvements in Swings, of which the following is a specification.

This invention relates to swings and more particularly to lawn swings.

The principal object of the invention is to by simple mechanism associate a hobby horse or similar amusement device with the lawn swing in such manner that as the swing is oscillated the hobby horse will be rocked back and forth, thus providing a novel type of amusement.

Further objects of the invention will appear as the following description is read in connection with the accompanying drawing, which forms a part of this application, and in which the figure is a perspective view.

Referring more particularly to the drawing, the lawn swing comprises, as is usual, inclined supporting members 1 carrying upon their upper end the swing supporting frame 2 and being connected together by the crossed diagonally arranged brace bars 3. Suspended from the frame 2 are the platform hangers 4 to which the platform 5 is pivotally connected. This platform may carry seats 6 at one or both ends, as is found desirable, and in the center of the platform there are secured two separated bearing supports 7 in the upper ends of which is journaled a shaft 8. This shaft carries a hobby horse or other similar device, as is shown, the horse being connected at its forward end by means of a link 9 to the cross bar 10 which connects the pair of diagonally extending arms 11 secured to the pivoted hangers 4 at one side of the swing and braced thereto by the diagonal braces 12. As the swinging platform is oscillated back and forth either by the occupants of the seat 6 or by movement of the body occupying the hobby horse, the cross bar 10 will approach and recede from the platform, as will be readily understood, thus raising and lowering the forward end of the hobby horse and rocking the same upon the support.

What is claimed is:—

1. In a lawn swing, the combination with a supporting frame, platform supporting hangers depending from and pivoted to said frame, a platform pivotally connected to the ends of said hangers, and a hobby horse pivoted upon the platform and operatively connected to certain of the hangers whereby upon oscillation of the swing the hobby horse will be rocked upon its pivotal connection.

2. In a swing, frame supports, a frame carried thereby, hangers pivoted to and depending from the frame, a platform carried by the hangers, seats on the platform, a hobby horse pivotally mounted upon the platform, arms extending outwardly from certain of the hangers, and a link connection between the arms and the hobby horse.

In testimony whereof I affix my signature in presence of two witnesses.

JAMES W. MOORE.

Witnesses:
J. S. CLINKINBEARD,
CHAS. TEXTOR.

Copies of this patent may be obtained for five cents each, by addressing the "Commissioner of Patents, Washington, D. C."